Aug. 18, 1931.  W. SCHROEDER  1,819,625
INDUSTRIAL TRUCK
Filed Oct. 19, 1928
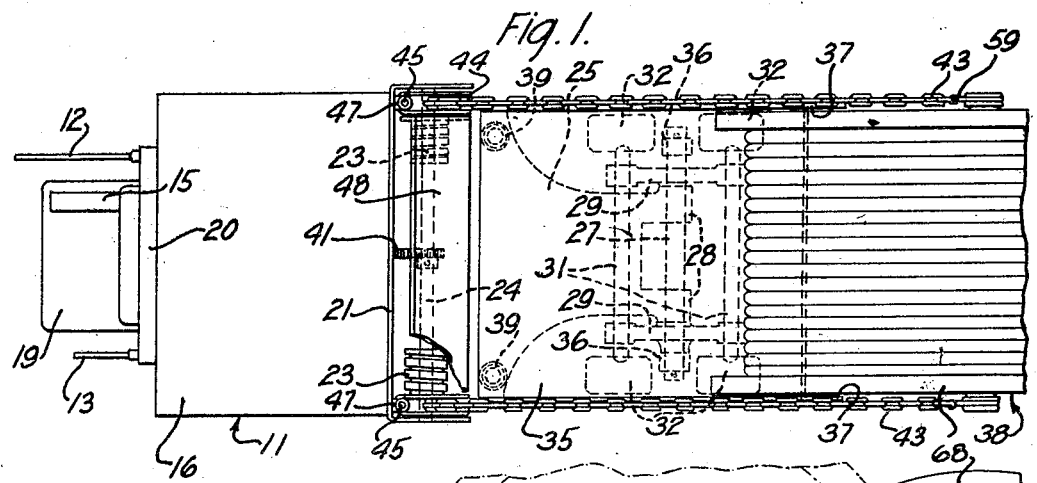
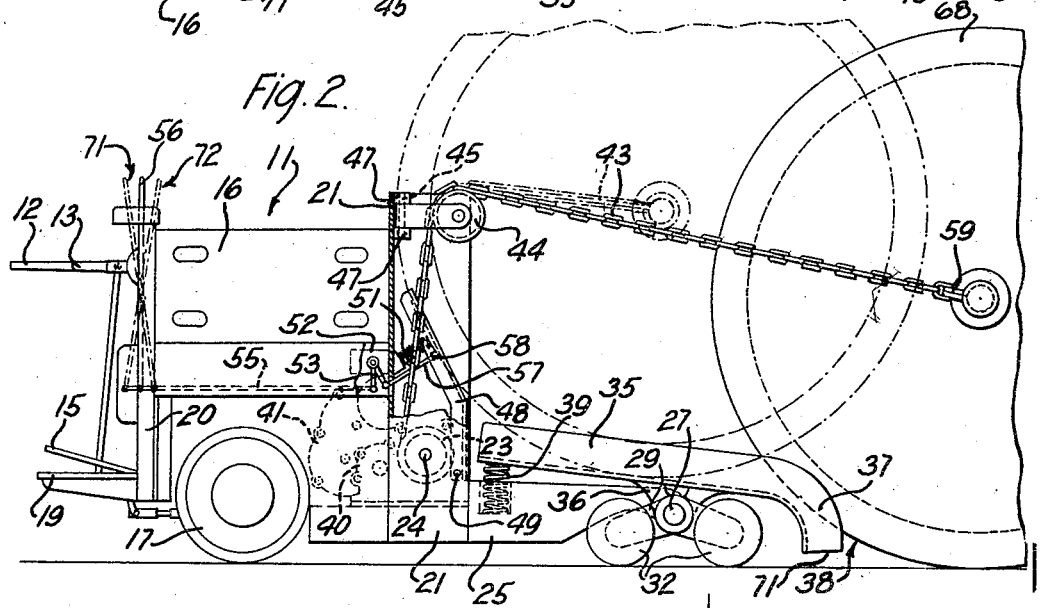
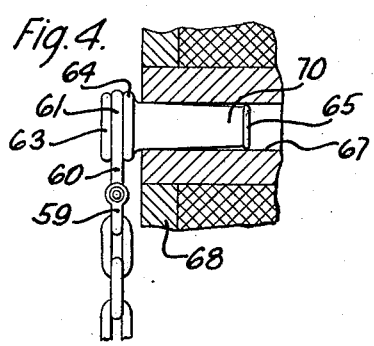
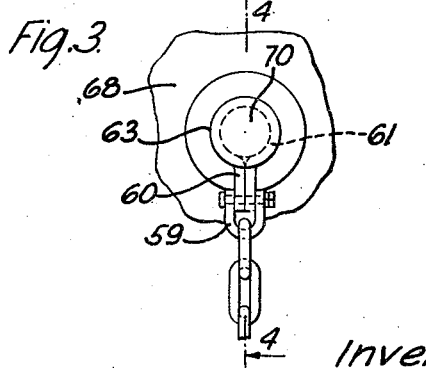
Inventor
William Schroeder
By [signature]

Patented Aug. 18, 1931

1,819,625

UNITED STATES PATENT OFFICE

WILLIAM SCHROEDER, OF ORANGE, NEW JERSEY, ASSIGNOR TO WESTERN ELECTRIC COMPANY, INCORPORATED, OF NEW YORK, N. Y., A CORPORATION OF NEW YORK

INDUSTRIAL TRUCK

Application filed October 19, 1928. Serial No. 313,434.

This invention relates to industrial trucks, and more particularly to electrically operated industrial trucks for transporting cylindrical objects such as telephone cable reels.

An object of this invention is to provide an industrial truck capable of expeditiously loading, transporting and unloading cylindrical objects.

In accordance with one embodiment of this invention, the object to be transported by the electrically operated truck which in the specific form of the invention is arranged with apertures, is rolled onto a spring supported, tiltable, inclined platform through the actuation of draw chains having at their free ends short center plugs which engage the apertures in the object. When the object has been rolled a predetermined distance, mechanism is operated for disconnecting the power from the draw chains and automatically limiting the movement of the object.

Other features and advantages of the invention will become more apparent from the following detailed description thereof, taken in conjunction with the accompanying drawings, in which Fig. 1 is a plan view partly in section of an electrical truck designed to transport cable reels;

Fig. 2 is a side elevational view thereof;

Fig. 3 is an enlarged view of a portion of the cable reel having a short center plug inserted therein, and Fig. 4 is a sectional view taken on the line 4—4 of Fig. 3 looking in the direction indicated by the arrows.

Referring now to the drawings wherein like reference characters designate the same parts throughout the several views, the numeral 11 designates generally an electrical industrial truck having the usual steering lever 12, a drive controlling lever 13, a brake controlling treadle 15 and a housing 16 under which is mounted a driving motor and its cooperating gearing and electrical storage batteries for supplying energy to the motor. For the sake of clearness and since they do not form a part of the present invention, the details of the aforementioned parts have not been shown. The batteries and motor with its cooperating parts mounted under the housing 16 furnish power to drive wheels 17 and may be controlled through the lever 13 by an operator standing on a platform 19 suspended from the housing 16 by a vertically disposed member 20. A U-shaped member 21 is attached to the other end of the housing 16 and has a shaft 24 journalled in the lower ends of the arms on which a pair of drums 23—23 are mounted. An irregularly shaped and horizontally disposed supporting member 25 is attached to the lower end of the U-shaped member 21 and extends longitudinally of the truck 11.

An equalizing axle 27 is journalled in bearings 28—28 formed in the right end (Fig. 1), of the member 25 and has a pair of V-shaped members 29 mounted thereon. The ends of the V-shaped members 29, away from the apex thereof, have a pair of axles 31—31 mounted therein to the ends of which are pivotally mounted in any well known manner four trailer wheels 32—32. A platform 35 is fulcrumed about the equalizing axles 27 at the ends thereof by means of depending portions 36—36 formed integral with the platform 35. The platform 35 has flanges 37—37 formed on the sides thereof to assist in maintaining a telephone cable reel designated generally by the numeral 38 in position thereon and is at its left hand end (Figs. 1 and 2) normally, resiliently supported by means of a pair of coiled springs 39—39 interposed between the lower surface of the platform 35 and the irregular shaped member 25.

An electric motor 40 is connected by means of a train of gears designated by the numeral 41 to the shaft 24 upon which the drums 23—23 are mounted and actuates a pair of chains 43—43, each of which has an end thereof secured to one of the drums 23—23. The chains 43—43 which are designed to be wound around the drums 23—23 pass over sheaves 44—44 pivoted about pins 45—45 whose ends are secured in bushings 47—47 fixed to the upper end of the member 21.

A bumper apron 48 extends between the arms of the U-shaped member 21 and is pivoted to said arms as shown at 49. A spring 51 interposed between the apron 48 and the base of the U-shaped member 21 normally urges the apron 48 to the right as shown in Fig. 2. A switch 52 controlled by a V-shaped lever 53 is mounted at the rear of the U-shaped member 21 and controls the supply of current from the storage batteries to the motor 40. One arm of the V-shaped member 53 is connected by means of a link 55 to a hand lever 56 mounted on the vertically disposed member 20. The other arm of the V-shaped lever 53 has a link 57 attached thereto, the other end of which is pivoted at 58 to the apron 48.

Secured to the end of the chain 43 are a pair of links 59 (as shown more clearly in Figs. 3 and 4) which are in turn secured to a member 60 having journalled in a circular portion 61 thereof a short center plug 70. The plug 70 is held in place in the circular portion 61 of member 60 by means of annular shoulders 63 and 64 formed thereon, and is free to rotate within said circular portion 61. The other end of the plug also has an annular protuberance 65 formed thereon of substantially the same size as an aperture 67 formed in heads 68—68 of the telephone cable reel 38.

It is believed that a clearer undrstanding of the mechanism to which this application is drawn will be had by reference to a description of the operation thereof. In loading a telephone cable reel 38 onto the platform 35 of a truck 11, the truck is maneuvered into a position substantially in alignment with the heads 68 of the cable reel 38. The center plugs 70 are then inserted in the apertures 67 in the heads 68 and the upper end of the lever 56 is moved to the left to the position shown in dotted lines at 71 (Fig. 2), to close an electrical circuit to furnish energy to the motor 40.

The motor 40 through gears 41 will drive the shaft 24 and drums 23 in a counter-clockwise direction, thus winding chain 43 thereon and drawing reel 38 to the left. As soon as the edges of the reel head 68 strike the platform 35, the platform 35 will be rocked about the equalizing axle 27 in a clockwise direction until the edge 71 of the platform 35 strikes the floor, thus taking a great amount of strain off of the trailer wheels 32 and materially reducing the amount of power required to move the reel 38. The reel 38 will thus be drawn onto the platform 35 and moved along it until the center of gravity thereof passes over the equalizing axle 27 when the platform 35 will be rocked in a counter-clockwise direction and into engagement with the springs 39, thus lifting the right end of the platform 35 off the floor and resiliently supporting the left end thereof during the transportation of the reel 38. The reel 38 will continue to be moved to the left until the edges of the head 68 thereof encounter the apron 48 and the apron 48 will then be moved to the left carrying with it the links 55 and 57 moving the levers 53 and 56 to the position shown in the full lines thus opening the circuit to the motor 40 and stopping the movement of the drums 23. The reel 38 is then transported to the desired location when the lever 56 may be moved from position shown in solid lines to the position indicated at 72, closing a circuit (not shown) controlled by the switch 52 to drive the drums in a clockwise direction to permit the reel 38 to roll off the platform 35 to the floor.

In order to accommodate reels of various widths the sheaves 44—44 over which the chains 43—43 pass are pivoted about the pin 45 so as to allow the chain to pass angularly to the center of any reel whose width does not exceed the distance between the inside edges of the flanges 37. Thus, telephone cable reels of any width up to a certain maximum may be expeditiously loaded, transported and unloaded by means of an industrial truck having the features as described and shown hereinbefore.

What is claimed is:

1. In an industrial truck, a platform for supporting an object, means for engaging the object to advance it onto the platform, driving means for actuating said engaging means, and a tiltable apron on the platform operable by the object when the object has reached a predetermined position to render said driving means inoperative.

2. In an industrial truck, a trailer assembly, a platform pivotally supported centrally of the trailer assembly for supporting an object, means for engaging and moving the object along a platform, and means operated by the object for rendering the moving means inoperative.

3. In an industrial truck, a platform, means for drawing a reel having apertures in the heads thereof onto the platform comprising a short center plug having an annular protuberance for insertion into the apertures in the reel head, a rotatable drum, driving means therefor, a cable having one end attached to said drum, and a swivel connection between the center plug and the chain.

4. In a truck for handling reels, a platform to support a reel, a pivot for the reel, means for engaging the pivot to roll the reel upon the platform, means to drive the engaging means, and means interposed in the path of the reel for coaction therewith to inhibit the operation of the driving means.

5. In an industrial truck, a platform for supporting an object and tiltable to any of a plurality of positions as determined by the position thereon of the object, means operative when the object is in a predetermined position for drawing the object on the platform, and means operated by the object when the object is in another position for rendering the drawing means inoperative.

6. In an industrial truck, a tiltable platform for supporting an object, means operative when the platform is in one position for drawing the object on the platform, means operative when the platform is in another position for rendering the drawing means inoperative, and resilient means for supporting the platform in one position when the object is thereon.

7. In an industrial truck, a trailer assembly, a horizontally disposed supporting member attached thereto, a platform pivotally supported centrally of the trailer assembly for supporting an object and adapted when in one position to tilt toward the horizontal member to facilitate movement of the object relative to the platform and means interposed between the platform and the supporting member for resiliently supporting the platform thereon.

In witness whereof, I hereunto subscribe my name this 4th day of October, A. D. 1928.

WILLIAM SCHROEDER.